United States Patent [19]

Moulton et al.

[11] Patent Number: 4,576,393
[45] Date of Patent: Mar. 18, 1986

[54] BICYCLE SUSPENSION

[75] Inventors: Alexander E. Moulton; Philip B. Uncles, both of Bradford on Avon, United Kingdom

[73] Assignee: Alex Moulton Limited, Wiltshire, England

[21] Appl. No.: 556,935

[22] Filed: Dec. 1, 1983

[30] Foreign Application Priority Data

Dec. 1, 1982 [GB] United Kingdom ............... 8234232

[51] Int. Cl.⁴ ..................... B62K 21/16; B62K 21/22
[52] U.S. Cl. ..................................... 280/276; 280/280
[58] Field of Search ............... 280/278, 274, 275, 276, 280/277, 279, 280, 283, 287

[56] References Cited

U.S. PATENT DOCUMENTS 3,208,767 9/1965 Moulton ........................... 280/276
4,410,197 10/1983 St. Hillaire ........................ 280/279

FOREIGN PATENT DOCUMENTS 970390 6/1950 France ............................... 280/276

Primary Examiner—John A. Pekar
Assistant Examiner—Mitchell J. Hill
Attorney, Agent, or Firm—Dennison, Meserole, Pollack & Scheiner

[57] ABSTRACT

A resilient suspension system for the front wheel of a bicycle includes a steering column supported on the frame of the bicycle and supports a handle bar at the upper end and a resilient suspension assembly at the opposite end. The suspension system includes a pair of main forks which are carried by a crown member mounted on the bottom of the steering column and the forks are displaced to the rear of the longitudinal centerline of the column. A subsidiary fork assembly is mounted within the steering column and extends generally along a common longitudinal axis to cooperate with the main forks to support the front wheel of the bicycle in a resilient fashion. The subsidiary forks and the main forks are interconnected by a pair of pivotal links which will permit relative movement between the main forks and the subsidiary forks in response to surface irregularities and transmit such movement to a compression assembly disposed within the steering column.

1 Claim, 3 Drawing Figures

BICYCLE SUSPENSION

This invention relates to a resilient suspension system for a bicycle front wheel.

The front wheel of a bicycle is conventionally carried by a fork suspended from a steering column; a steering column being a hollow tube surmounted by handle bars, and supported relative to the frame of the bicycle by widely spaced upper and lower ball bearing assemblies which, in well known manner, are arranged to permit the steering column tube to rotate about its own axis, while the bearings prevent the steering column from moving axially.

One prior resilient front wheel suspension for a bicycle is exemplified in U.S. Pat. No. 3,208,767 and in British Patent Specification No. 1 047 783. In these prior Specifications there is described a suspension system for the front wheel of a two-wheeled cycle vehicle wherein the wheel is connected to the vehicle frame by means of a single resiliently controlled telescopic strut assembly comprising a tubular steering column adapted to be surmounted by handlebars and arranged for rotary movement about its axis but prevented from axial movement relative to the vehicle frame and an inner tubular element arranged to be rigidly associated with the wheel and arranged for resiliently controlled movement axially within said steering column, there being a bearing bush fixed at the lower end of the steering column adapted and arranged to perform the dual function of both guiding said inner tubular element during its axial movement within the steering column and on rotary movement being imparted to the steering column by the handlebars, to transmit such rotary movement to the inner tubular element to cause the latter to rotate about its axis and thus to enable the front wheel to be steered.

In such telescopic systems, the tube sliding within the steering column is spaced a large distance from the road and is as a consequence subjected to lateral loadings which increase friction in the telescopic sliding mode. In motorized cycles it is usual to transverse this disadvantage by employing twin telescopic forks, however, these would be too heavy if employed in a pedal cycle.

Accordingly this invention has for its object to provide a resilient suspension for a bicycle front wheel which is light in weight, has low frictional characteristics, and in which the wheel, while being resiliently suspended, is structurally supported so as to be maintained in its proper plane relative to the remainder of the machine as it responds to the varying demands of the rider.

Leading link type suspension has the advantage of lower friction, in suspension movement, than the single telescopic type, because the loaded wheel supporting elements are nearer to the road. Structural integrity for the wheel spindle, in order to maintain wheel alignment and in order to hold the wheel in its correct plane remains an essential requirement. Moreover bicycle wheel spindles have to be easily withdrawn, normally by drop out arrangement from the fork arms, while the spindle itself should have slender dimensions.

Accordingly, this invention provides a resilient suspension for a bicycle front wheel comprising a steering column from which depends a main fork with arms, one on each side of the wheel, main fork arms being set back from and extending parallel to the axis of the steering column and said main fork arms extending also alongside of a pair of subsidiary fork arms having a crown which embraces the wheel, there being a pair of leading links carried at the lower ends of the main fork arms, said links, on each side of the wheel, being articulated to lower regions of the subsidiary fork arms adjacent to bolted connections with the front wheel spindle carried at the lower ends of the subsidiary fork arms, and there being upstanding from the crown of the subsidiary fork a push rod which extends into the steering column lower end and therein bears against a compression spring.

In this invention the structural integrity of the leading links in their support of the wheel is ensured not by the wheel spindle but by the subsidiary fork with its own crown which embraces the wheel, and the legs of which are articulated, as near to the wheel centre as possible, to the leading ends of the pair of links carried at the lower ends of the main or primary forks which are set back from the steering column.

From the mid point of the crown of the subsidiary fork the rubber and coil push rod acts by way of an interposed buffer upon a rubber or coil spring (or a composite rubber and coil spring) which can be housed inside the steering column conveniently rotating with it. For location of the subsidiary fork the buffer is constituted as a sliding bearing moving within the steering column to support axial movement of the push rod or pillar. The push rod or pillar may have a screw threaded connection with the buffer whereby its effective length may be changed to alter the trim height to cater for different loadings or riders.

The crown of the subsidiary fork is a convenient point for mounting a brake assembly, it being appreciated that this arrangement will allow a caliper brake to hold a sensibly constant position in relation to the wheel rim in the rise and fall of the suspension.

Tests have shown that this front wheel suspension exhibits high steering stability due to rigidity of wheel location and low controllable suspension friction.

The invention will now be described with reference to the accompanying drawings, in which.

Figure 1:
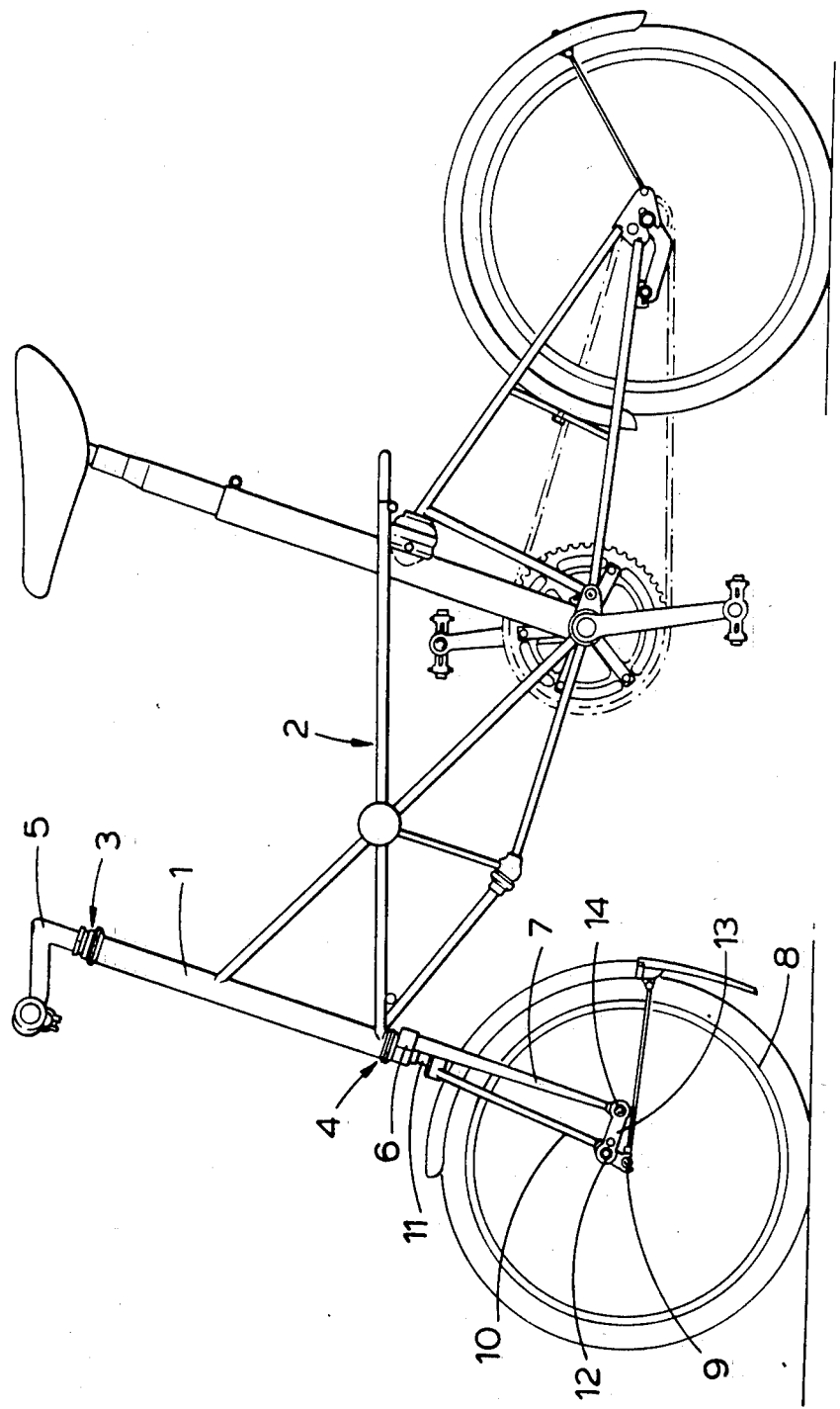
FIG. 1 is a side view.
Figure 2:
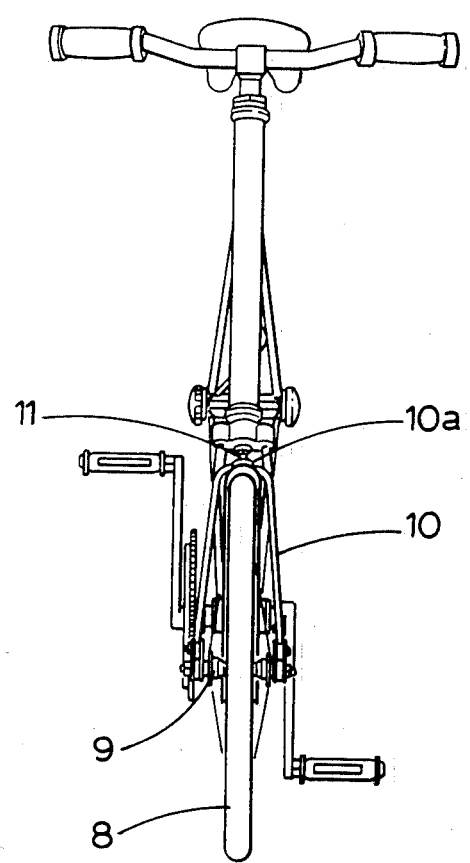
FIG. 2 is a view from the front.

In the drawings, 1 represents a head tube being an upwardly extending hollow tube constituting the leading part of a bicycle frame generally designated 2. Supported within the head tube 1, by means of widely spaced bearings generally designated 3 and 4, in known manner, is a steering column 1a mounting at its upper end, a stem 5 for handle bars 5a and at its lower end a crown 6 of a main or primary fork. From the crown 6 depend primary fork arms 7, one on each side of the front wheel 8. The primary fork arms 7 extend parallel to the axis of the steering column 1a but are set back from this axis.

The wheel 8 has a spindle or hub 9 detachably secured in known manner by bolted connections, to the lower ends of a pair of subsidiary fork arms 10, which extend alongside the arms 7 of the main fork.

Figure 3:
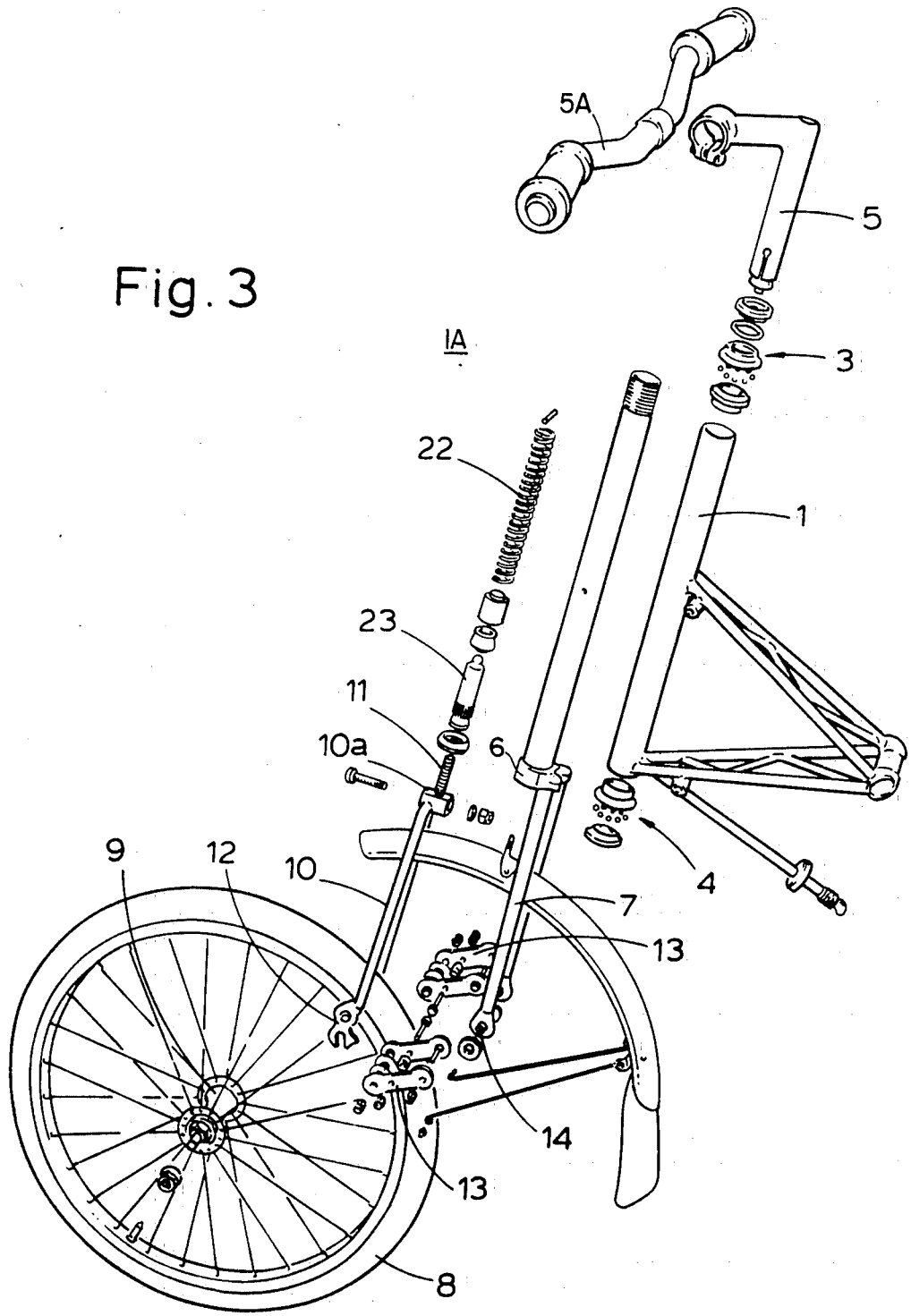
FIG. 3 is an exploded view.

The subsidiary fork arms 10 have a crown 10a, shown more clearly in FIG. 3, from which upstands a push rod 11. The push rod 11 extends upwardly into the steering column 1a to bear, through an interposed buffer 23, against a compression spring 22 located within the column 1a preferably rotating therewithin. For location of the subsidiary fork, the buffer 23 is constituted as a sliding bearing moveable within the steering column 1a to support the axial movement of the push rod 11. The buffer 23 is adjustable axially of the push rod 11 by screw thread means so that the axial length of the push rod 11 is, in effect, adjustable to alter the trim height.

The lower ends of the arms 10 of the subsidiary fork are articulated at 12, i.e. at locations near the bolted connection with the wheel spindle 9, to the leading ends of a pair of links 13 on each side of the wheel 8 which are in turn pivoted to the lower ends of the primary forks 7 by hinge pins at 14. The crown 10a of the subsidiary fork is a convenient point for mounting a brake assembly, since the brake will then be carried in a constant location relative to the rim of the wheel 8 as it rises and falls.

We claim:

1. A resilient suspension system for the front wheel of a bicycle comprising a supporting frame (1), a steering column (1A) rotatably mounted within said frame and carrying a first crown (6) element at one end thereof, and a stem (5) supporting a handle bar (5A) at the other end, a primary fork including a pair of primary fork arms (7) mounted on said crown (6) with its longitudinal axis displaced to the rear and generally parallel to the axis of said steering column (1A), said primary fork extending downwardly from said crown and terminating in a hinge pin support (14), a subsidiary fork assembly includes a second crown (10A) from which a pair of subsidiary fork arms (10) extend downwardly and supporting at their lowermost end an articulated connection configured to receive and support each end of a wheel spindle (9), a pair of links (13) pivotally interconnecting the primary and subsidiary forks adjacent each end of the spindle, a push rod (11) mounted on said second crown (10A) and extending vertically therefrom into the lower end of said steering column, and a compression assembly including a compression spring (22) within said steering column and connected to said push rod (11) for controlling resilient vertical movement of said suspension system, and wherein a slidable buffer (23) is interposed between said compression spring (22) and said second crown (10A), said buffer (23) being slidable within the steering column (1a) in response to movement of the crown (10A) and said push rod (11), said buffer (23) being threaded on to the push rod (11) and being adjustable axially of the rod.

\* \* \* \* \*